United States Patent [19]

Spencer

[11] Patent Number: 5,848,525
[45] Date of Patent: *Dec. 15, 1998

[54] FUEL MANIFOLD STAGING VALVE

[75] Inventor: William R. Spencer, Springdale, Ohio

[73] Assignee: General Electric Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 697,807

[22] Filed: Aug. 30, 1996

[51] Int. Cl.$^6$ .............................. F02C 7/232; F02C 9/28
[52] U.S. Cl. ........................... 60/39.281; 60/739
[58] Field of Search .................... 60/39.281, 734, 60/739

[56] References Cited

U.S. PATENT DOCUMENTS

| | | | |
|---|---|---|---|
| 5,257,502 | 11/1993 | Napoli | 60/739 |
| 5,321,949 | 6/1994 | Napoli et al. | 60/739 |
| 5,442,922 | 8/1995 | Dyer et al. | 60/739 |

*Primary Examiner*—Louis J. Casaregola
*Attorney, Agent, or Firm*—Andrew C. Hess; Nathan D. Herkamp

[57] ABSTRACT

A fuel manifold staging valve is provided for use with aircraft engines. A first set of fuel nozzles is associated with a primary manifold, and a second set of fuel nozzles is associated with a secondary manifold. The valve opens on the basis of a constant ratio of fuel flow divided by compressor discharge pressure. The valve detects fuel flow by sensing the pressure drop across the fuel nozzles. This pressure drop is biased by a spring and compared to the compressor discharge pressure. When the ratio is correct for the geometry of the valve, the valve begins to open, allowing fuel to flow to the secondary manifold and associated fuel nozzles.

2 Claims, 3 Drawing Sheets

FUEL MANIFOLD STAGING VALVE

TECHNICAL FIELD

The present invention relates, in general to jet aircraft engines and, more particularly, to a fuel manifold staging valve for such engines.

BACKGROUND OF THE INVENTION

Some aircraft engines have a fuel manifold staging valve so that, at low fuel-air ratios, the metered fuel going to the combustor all goes to one manifold and one set of fuel nozzles. As the fuel-air ratio is increased to increase engine speed, a second manifold and a second set of fuel nozzles begin to receive metered fuel flow.

Unfortunately, current manifold staging valves, such as is on the General Electric CFM56-5A engine, are complex. On the General Electric CFM56-5A engine, the electronic control computes the fuel-air ratio and signals, through a solenoid valve, the staging valve to open the fuel line to the second manifold. Although this improves engine acceleration and reduces exhaust emissions, the staging valve has more than two dozen parts, not including bolts and seals. There are four moving parts, one dynamic seal to ambient, two small fuel lines which power the valve, and an overboard drain line. The manifold staging valve also requires a solenoid valve and cable and a solenoid driver in the electronic control along with fuel-air ratio computation. Redundant switches provide a valve-closed indication.

It would be desirable, then, to have a less complicated fuel manifold staging valve for use with aircraft engines. The objects, features and advantages of the present invention will become more readily apparent in the following description when taken in conjunction with the appended drawings.

SUMMARY OF THE INVENTION

The present invention provides for a simplified fuel manifold staging valve for use with aircraft engines. The fuel manifold staging valve has a reduced parts count, as compared to current manifold staging valves. The valve of the present invention differs from the prior art in that it does not open on the basis of fuel-air ratio.

Briefly, in accordance with one aspect of the present invention, a fuel manifold staging valve is provided for use with aircraft engines. The valve opens on the basis of a constant ratio of fuel flow divided by compressor discharge pressure, which is closely related to fuel-air ratio. The valve detects fuel flow by sensing the pressure drop across the fuel nozzles. This pressure drop is biased by a spring and compared to the compressor discharge pressure. When the ratio is correct for the geometry of the valve, the valve begins to open, allowing fuel to flow to the secondary manifold and fuel nozzles. A dashpot can be included to cause the valve to open slowly.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with objects and advantages thereof, may best be understood by reference to the following description taken in conjunction with the accompanying drawings in which:

DETAILED DESCRIPTION OF THE INVENTION

Figure 1:
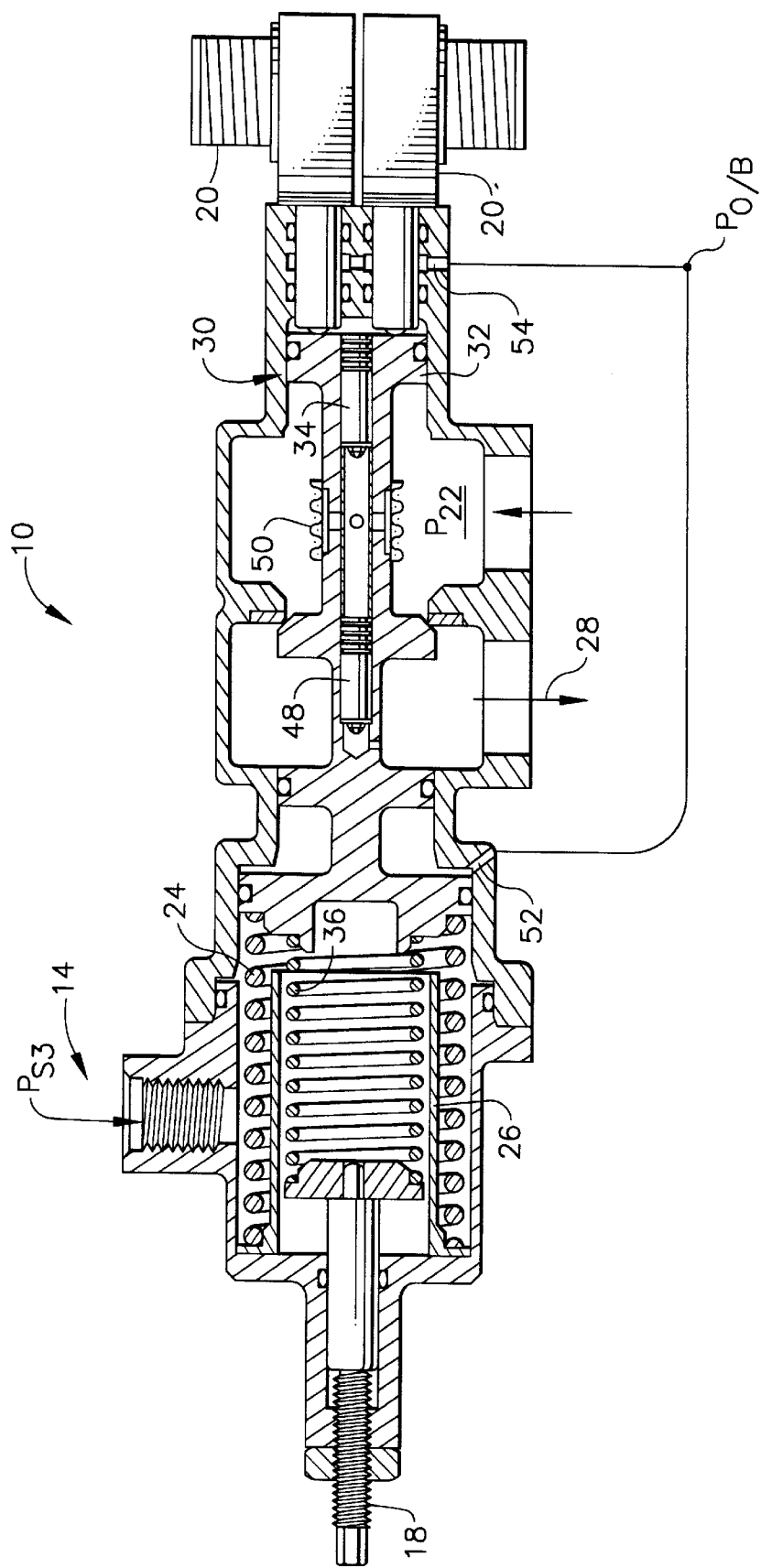
FIG. 1 is a fuel manifold staging valve, constructed in accordance with the present invention.

Referring to the drawings, in FIG. 1 there is illustrated a fuel manifold staging valve 10. The staging valve according to the present invention has a reduced overall parts count, one moving part, an overboard drain line, and one small pneumatic line. The present invention does not require dynamic seals to ambient, and does not require intelligence from the electronic control.

In accordance with the present invention, the valve 10 opens in relation to a constant ratio of fuel flow ($W_f$), as indicated by the equation ($P_{22}$–$P_{S3}$), divided by compressor discharge pressure ($P_{S3}$), input at 14, which is closely related to fuel-air ratio, as opposed to a direct fuel-air ratio. The constant ratio of fuel flow divided by compressor discharge pressure adjustment 18 trims the force balance on the valve piston so that the valve opens at the correct $W_f/P_{S3}$ value.

Figure 2:
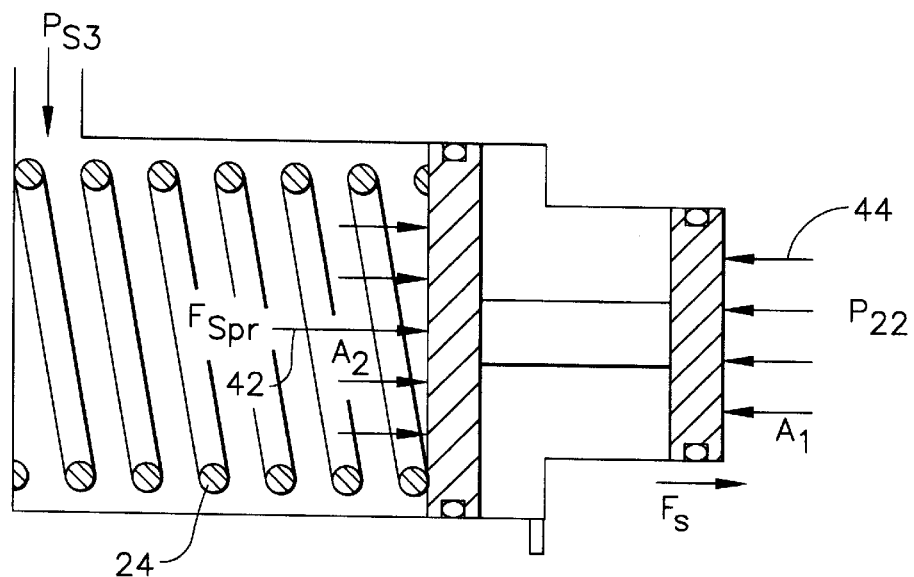
FIG. 2 is the rationing portion of the fuel manifold staging device of FIG. 1.
Figure 3:
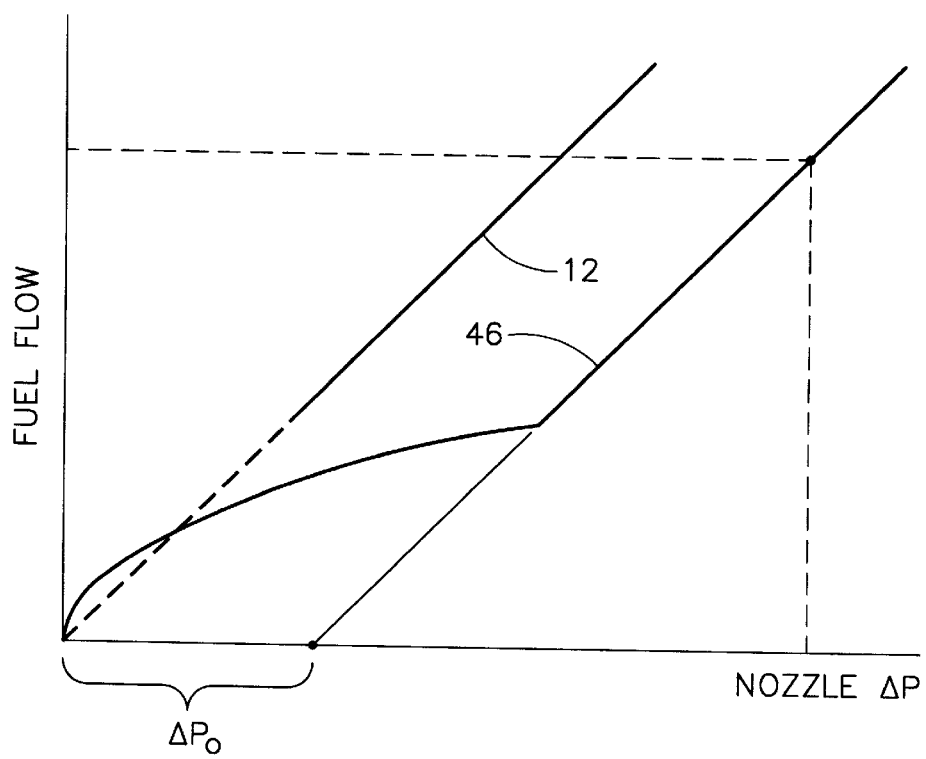
FIG. 3 is a curve illustrating fuel nozzle characteristics.
Figure 4:
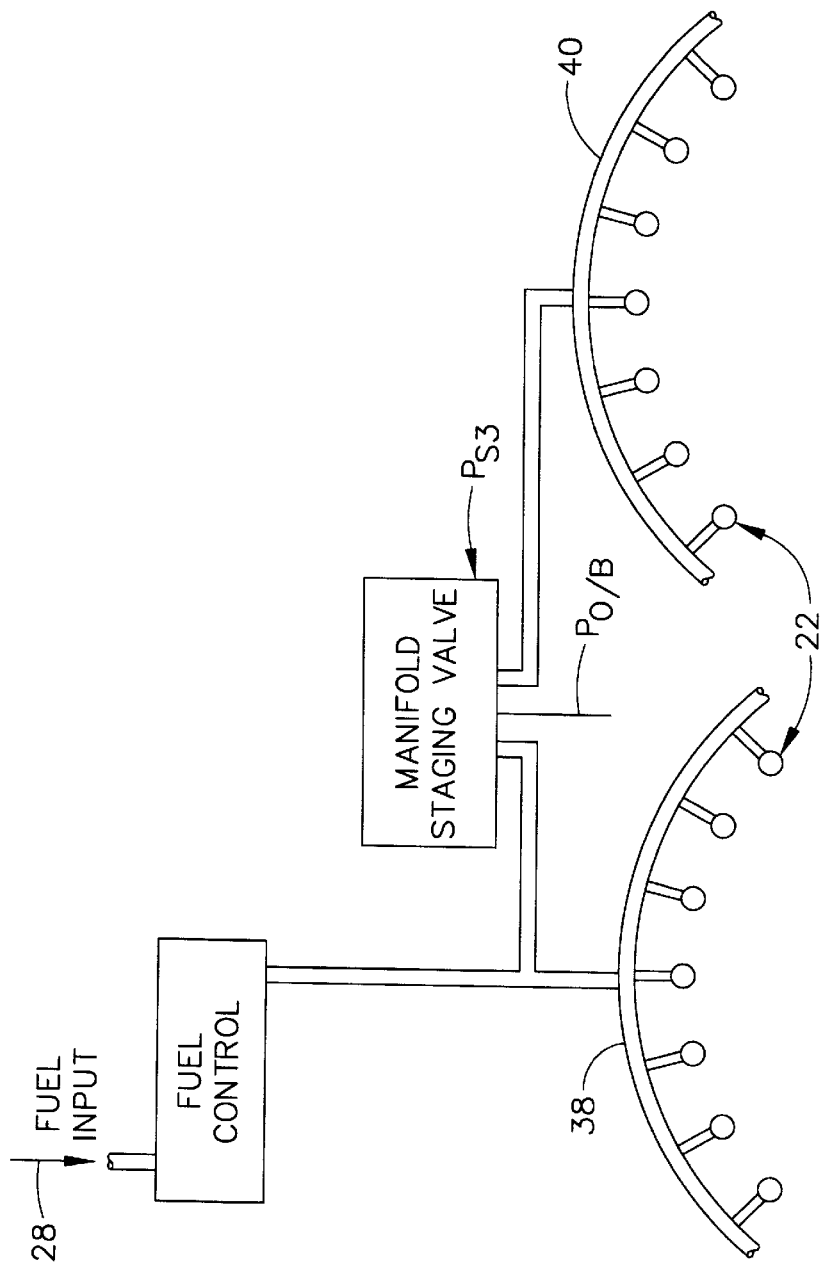
FIG. 4 is a piping schematic in accordance with the present invention.

The valve 10 detects fuel flow by sensing the pressure drop across primary fuel nozzles 22, best illustrated in FIG. 4. A primary manifold 38 and a secondary manifold 40 have associated fuel nozzles 22. The pressure drop across the primary fuel nozzles is biased by springs 24 and 36, in FIG. 1, and compared to the compressor discharge pressure. The total spring force plus the seal friction provide the bias to balance the force delta $P_0 A_1$, of FIGS. 2 and 3. This causes the net straight line portion 12 of the fuel nozzle curve of FIG. 3 to pass through the origin, making the net nozzle delta $PA_1$ force proportional to fuel flow in the range where the valve opens. When the ratio is correct for the geometry of the valve 10, the valve begins to open, allowing fuel to flow in the direction of arrow 28 to secondary manifold 40 and its associated fuel nozzles 22, as illustrated in FIG. 4. When the fuel pressure force equals the spring 24 force $F_{Spr}$ and the engine compressor discharge pressure $P_{S3}$ force plus seal friction $F_S$, as shown in FIG. 2, the valve begins to open. A valve open stop 26 allows the valve to open far enough for proper function and prevents over-stroking of the dynamic seals.

The valve 10 opens based on a constant ratio of fuel flow divided by compressor discharge pressure. This value is set by two constants and the ratio of two piston areas of the valve. FIG. 2 illustrates the piston areas that establish the $W_f/P_{S3}$ ratio for opening the valve. The first area, $A_1$, is the piston area that the fuel pressure acts on. The second area, $A_2$, is the piston area that the $P_{S3}$ pressure acts on. The force of the spring 24 is indicated by arrow 42 as $F_{Spr}$. The fuel pressure to the primary nozzles 22 is $P_{22}$, a force in the opposing direction of $F_{Spr}$, indicated by arrow 44. The value to open the valve is:

$$W_f/P_{S3} = (1-k)K(A_2/A_1 - 1)$$

where $$k = P_{O/B}/P_{S3}.$$

$P_{O/B}$ is overboard drain pressure and $P_{S3}$ is compressor discharge pressure. Drains 52 and 54 are provided to carry away any small leakage of fuel past the seals, and also to provide $P_{O/B}$ pressure between the $A_1$ and $A_2$ piston areas.

Referring back to the above equations, K is the rate of change of fuel flow with fuel nozzle pressure differential ($dW_f/d$ $deltaP_n$), i.e., the slope 46 of the straight line portion of the fuel nozzle flow curve of FIG. 3, in the range where the staging valve is to open. In normal operation, k has a very narrow range at the given $W_f/P_{S3}$.

In existing staging valves, two switches provide redundant indication that the valve is closed. In accordance with the present invention, these two switches are replaced by proximity sensors 20, shown in FIG. 1, thereby eliminating a dynamic seal to ambient. In accordance with the present invention, at least one linear variable differential transformer (LVDT) driver (not shown) is required for proximity sensors 20. The LVDT driver is an electronic power supply for providing electrical excitation for the proximity sensors 20. The LVDT driver or drivers are commonly found in the electronic control. The proximity sensors 20 indicate whether the valve is open or closed. This is a safety feature to protect the engine in case the valve fails to open. In a preferred embodiment of the present invention, two LVDT drivers can be used to provide redundancy for reliability.

In a preferred embodiment of the present invention, valve 10 comprises a dashpot 30 to cause the valve to open slowly. The dashpot 30 further comprises an associated dashpot piston 32 and an associated restrictor 34. A second restrictor 48 provides a small flow to keep the secondary manifold filled in case a fuel nozzle leaks slightly. A wash screen 50, situated between the restrictors 34 and 48, protects the restrictors from contamination.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

I claim:

1. A fuel manifold staging valve having an associated valve piston, for use with aircraft engines having a compressor and an associated compressor discharge pressure, comprising:

a first set of fuel nozzles associated with a primary manifold and a second set of fuel nozzles associated with a secondary manifold;

means for defining a ratio of two piston areas of the valve, the first area being a piston area that fuel pressure to the first set of fuel nozzles acts on and the second area being a piston area that compressor discharge pressure acts on;

a spring force for biasing a fuel pressure force, said pressure force generated by pressure acting over the first area, the spring force being in an opposing direction to the fuel pressure force;

a force balance on the valve piston to maintain the valve in a closed position until a correct ratio is achieved by having the fuel pressure force equal the compressor discharge pressure force plus the spring force plus seal friction, such that when the correct ratio is achieved, the valve opens, allowing fuel to flow to the secondary manifold and the second set of fuel nozzles.

2. A fuel manifold staging valve as claimed in claim 1 further comprising a dashpot to cause the valve to open slowly when the correct ratio is achieved.

* * * * *